(12) United States Patent
Qiu et al.

(10) Patent No.: US 7,395,702 B2
(45) Date of Patent: Jul. 8, 2008

(54) STEP-ADJUSTABLE TIRE PRESSURE MONITORING SENSOR SIGNAL HOUSING ASSEMBLY

(75) Inventors: Zhenfang Qiu, Shanghai (CN); Jiansong Huang, Shanghai (CN); Zhidong Chen, Shanghai (CN)

(73) Assignee: Shanghai Baolong Automotive Corporation, Shanghai (CN)

( * ) Notice: Subject to any disclaimer, the term of this patent is extended or adjusted under 35 U.S.C. 154(b) by 0 days.

(21) Appl. No.: 11/796,833

(22) Filed: Apr. 30, 2007

(65) Prior Publication Data
US 2008/0127724 A1 Jun. 5, 2008

(30) Foreign Application Priority Data
Dec. 4, 2006 (CN) .................. 2006 2 0048460 U

(51) Int. Cl.
*G01M 17/02* (2006.01)
(52) U.S. Cl. .................. 73/146.8; 73/146; 137/224
(58) Field of Classification Search .................. 73/146, 73/146.8; 137/223, 224
See application file for complete search history.

(56) References Cited

U.S. PATENT DOCUMENTS

| | | | |
|---|---|---|---|
| 5,491,465 A | 2/1996 | Adams | |
| 5,844,131 A * | 12/1998 | Gabelmann et al. | 73/146.8 |
| 6,055,855 A | 5/2000 | Straub | |
| 6,591,672 B2 | 7/2003 | Chuang et al. | |
| 2002/0023676 A1 * | 2/2002 | Reinhardt | 137/223 |
| 2002/0134428 A1 * | 9/2002 | Gabelmann | 137/224 |
| 2003/0015030 A1 * | 1/2003 | Gabelmann | 73/146 |
| 2003/0066343 A1 | 4/2003 | Fischer et al. | |

OTHER PUBLICATIONS

U.S. Appl. No. 11/796,834, filed Apr. 30, 2007, Qiu et al.

* cited by examiner

*Primary Examiner*—Andre J Allen
(74) *Attorney, Agent, or Firm*—Hamre, Schumann, Mueller & Larson, P.C.

(57) ABSTRACT

This present invention discloses a step-adjustable tire pressure monitoring sensor signal housing assembly including a valve and a valve core fixed on a rim, a sensor signal housing which consists of a housing holder and a connecting part, the connecting part has a curve connecting face where a Slot 1 is provided, and a Slot 3 is provided on the housing holder under the connecting part; a D block, which is in D shape and has a flat part and a cylinder part, a Slot 2 is provided in the center of the cylinder part perpendicular to the flat part, some ratchet teeth are provided longitudinally in the cylinder part by the side of a mounting hole; a U-pawl and a spring, which are installed in the Slot 3, the spring is in the bottom of the U-pawl and the top of the U-pawl is corresponding to the ratchet teeth on the D block; and a connector which fixes the sensor signal housing and the D block onto the tire valve through the Slot 1 in the signal housing and the Slot 2 on the D block. This present invention is applicable for all the rims of 5~35°, and therefore is widely applicable and easy to install.

5 Claims, 2 Drawing Sheets

STEP-ADJUSTABLE TIRE PRESSURE MONITORING SENSOR SIGNAL HOUSING ASSEMBLY

FIELD OF THE INVENTION

This present invention involves a ratchet signal housing assembly containing an automobile tire pressure monitoring sensor (TPMS), the rotating angle of which can be adjusted to apply for the rims of 5°~35°

PRIOR ART

Inflation is required for all vehicle tires at present. As the tire pressure concerns the driving safety of vehicles, it is necessary to install electronic safety sensors on tires for real time monitoring of the tire pressure. Vehicle manufacturers in different countries have launched out monitoring devices consisting of an electronic sensor and a tire valve for installing on vehicle tires to monitor the tire pressure. However, a tire valve has to be installed externally due to the special closed structure of tires, and a prior tire valve with an installed electronic signal housing (containing monitoring elements and batteries) is much larger than a traditional one, so it is difficult to install. In addition, there are various sizes of vehicle rims (rings), and an electronic signal housing containing electronic elements and batteries need to be fixed on the rim and locked on the rim hole firmly to withstand the centrifugal caused by tire rotation. However, if the signal housing on the tire valve is completely connected to the rim, the friction heat generated by the high speed rotating rim will be transferred to the electronic signal housing in the tire and influence the reliability of the electronic elements (heat dissipation is difficult). In addition, the centrifugal caused by the high speed rotating tire changes with the change of speed and road evenness, so the radial load applied on the tire valve changes unceasingly resulting in unsecured and loose installation. In addition, the rims are circular and their radius, arc size and shape differ from one another, so the electronic signal housing on the tire valve may not be connected properly to the rim, and one size of electronic signal housing cannot apply to multiple sizes of rims. Therefore, there are few of products which can reliably, successfully and economically used for commercial purposes in China and abroad. The main reason is that the design structure is complicated and lack of commercial practicability. For example, for some products in which the electronic signal housing fixed on the rim by a steel strip, the steel strip is liable to loosing and falling off with vibration; for some products with the electronic signal housing is bonded on the rim with glue, the electronic elements may be overheated and damaged because the humidity and temperature conditions are severe and the housing is connected to the rim (steel or aluminum), the heat generated by braking will be transferred to the housing to cause the electronic elements inside overheated, in addition, the adhesion of the glue will deteriorate after a long period of operation resulting in falling of, and for some products in which the tire valve is molded with the electronic signal housing, the housing and the tire valve cannot be rotated and adjusted, and with a same process precision, one size of signal housings is only applicable for 1 size of rims. There are also some products with adjustable electronic signal housing and tire valve, but it is hard to ensure the stability of the structure, and a long period of vibration will cause looseness.

SUMMARY OF THE INVENTION

Aiming at the above problem, this present invention brought out a ratchet-adjustable automobile tire pressure monitoring sensor signal housing assembly, which is applicable for rims (5-35°) with an adjustable rotation angel. The tire valve of the assembly can be a metal valve or a snap-in valve.

To realize the purposes stated above, this present invention provides a step-adjustable tire pressure monitoring sensor signal housing assembly including a valve and a valve inside fixed on a rim wherein the assembly further contain: a sensor signal housing which consists of a housing holder and a connecting part. The said connecting part has a curve connecting face where a Slot 1 is provided, and a Slot 3 is provided in the said connecting holder under the said connecting part; a D block, which is in D shape, includes a flat part and a cylinder part, a Slot 2 perpendicular to the said flat part is provided in the center of the said cylinder part with some ratchet teeth are provided longitudinally on of the cylinder part by the side of the said mounting hole; a U-pawl and a spring are installed in Slot 3 in the said connecting part, the said spring is in the bottom of the said U-pawl and the top of the said U-pawl is corresponding to the said ratchet teeth of the said D block; and a connector, which fixes the sensor signal housing and D block onto the tire valve through Slot 1 in the signal housing and Slot 2 in D block.

The advantage is that the connecting face of the said sensor signal housing and the cylinder of the D block are concentric arcs.

The advantage is that the said Slot 1 is a curve long slot, the said Slot 3 and ratchet teeth are in a same direction.

The advantage is that said assembly further includes two rubber columns and on both sides of the signal housing each has a connecting hole, the said rubber columns fix the signal housing onto the rim through the connecting holes.

The advantage is that the number of ratchet teeth is 1~7.

The TPMS signal housing assembly of this present invention is connected to the tire valve in a movable way, which is not only convenient for installation and debugging, but also applicable for rims of various sizes.

BRIEF DESCRIPTION OF THE DRAWINGS

For those familiar with this technical field, the above and other purposes, features and advantages of this present invention are apparent through the detailed description with reference to the figures.

DETAIL DESCRIPTION OF THE INVENTION

Figure 1:
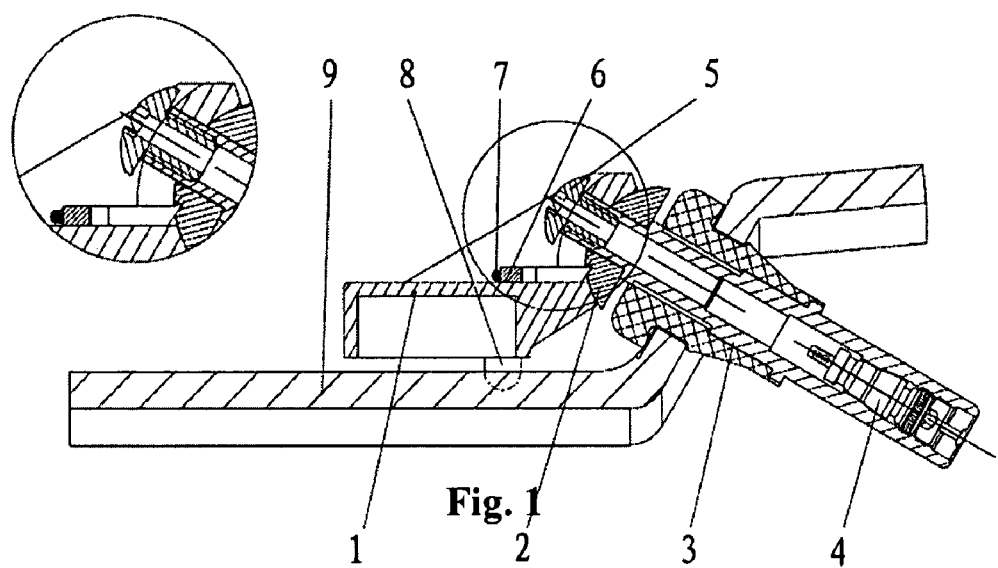
FIG. 1 is a cross-section view of this present invention.
Figure 4:
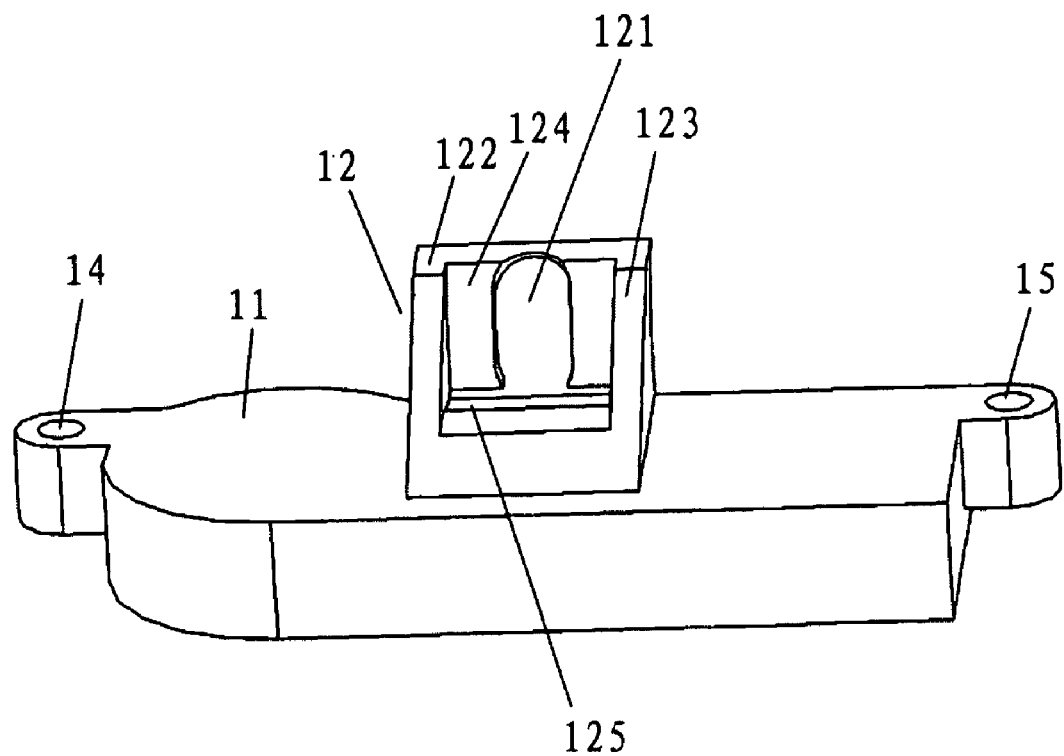
FIG. 4 is a perspective diagram of the sensor signal housing in FIG. 1.

The tire pressure monitoring sensor signal housing assembly of this present invention is shown in FIG. 1, consisting of sensor signal housing 1, a D block 2, a valve 3, a valve inside 4, a screw 5, a U-pawl 6, a spring 7 and a rubber column 8. The sensor signal housing 1 is shown in FIG. 4, including a housing holder 11 and a connecting part 12 on the center of housing holder 11. The connecting part 12 consists of two symmetrical connectors 122 and 123 and a curving connecting face 124 between the connector 122 and 123, a long slot 121 is provided perpendicular to the connecting face 124. A pawl sliding slot 12 is horizontally provided under the connector 122 and 123. Besides, two symmetrical connecting holes 14 and 15 are also provided on both sides of signal housing 11.

Figure 3:
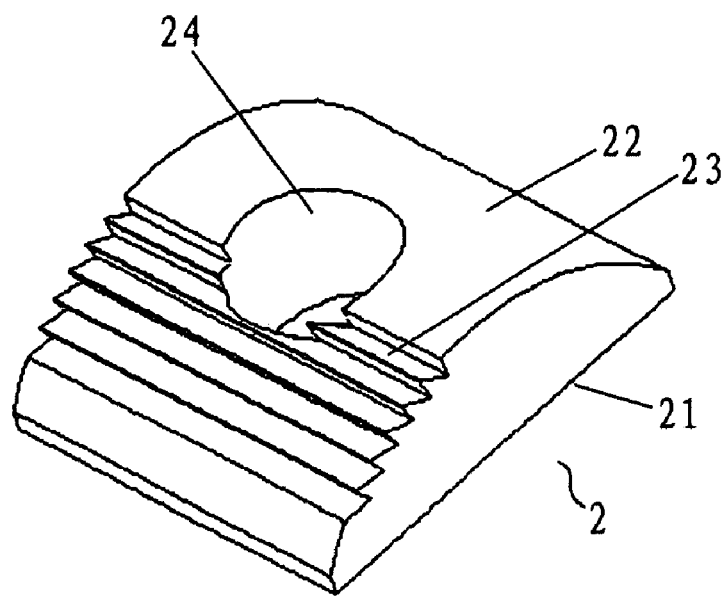
FIG. 3 is a perspective diagram of the D block in FIG. 1.

The structure of the D block 2 is shown in FIG. 3 which is in D shape, including a flat part 21 and a cylinder part 22. A mounting hole 24, which is perpendicular to the flat part 21, is provided on the center of cylinder part 22 of D block 2. On one side of the mounting hole 24 of the cylinder part 22 of the D block 2, several ratchet teeth 23 are provided longitudinally. The ratchet 23 is divided into seven steps with the consideration of rim dimension, as shown in the diagram. The central angle of each step is 5° and the total central angle of the 7 steps is 35°

Figure 2:
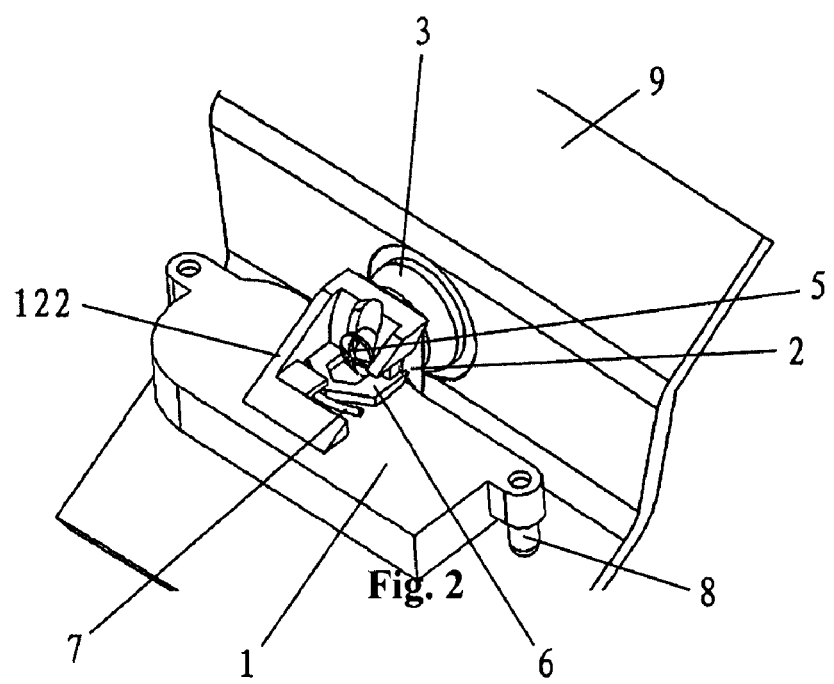
FIG. 2 is a partial perspective diagram of the present invention in FIG. 1.

For installation, refer to FIG. 2 showing the structure of the connecting part 12 without the connector 123. First, install the D block 2 onto the tire valve 3 through the mounting hole 25 with the flat part 21 abutting against the shoulder on the surface of the tire valve 3. Second, place the U-pawl 6 and the spring 7 into the ratchet sliding slot 125 of the connecting part 12 and the bottom of the ratchet 6 holds the spring 7. Then fix the long slot 121 in the connecting face 124 of the sensor signal housing 1 to the valve 3, the curving connecting face 124 can perfectly matches with the cylinder part 22 of the D block 2 without any clearance because they are concentric arcs, and the U-pawl 6 is connected with the side of ratchet 23 of D block 2. Finally, put the screw 5 through the long slot 121 in sensor signal housing 1 and the mounting hole 24 of D block 2, thus the signal sensor housing 1 and D block 2 are fixed on the valve 3. Besides, two rubber columns 8 can be placed into the connecting holes 14 and 15 in the signal housing 1 as required. Installed as FIG. 1, the signal housing 1 rotates downward around the D block 2 when pressing the signal housing 1 and the distance between the signal housing 1 and the rubber column 8 is compressed after the rubber column 8 contacts the rim 9. The pressure will be released when the U pawl 6 clicks into the corresponding ratchet of the D block 2. The upper flat part of the U pawl 6 can be connected to the under flat part of corresponding ratchet tooth of the D block 2 owing to the resilience of the rubber column 8 and the spring 7. In operation, according to FIG. 4, a curve long slot 121 is provided in the vertical direction in the connecting area between the signal housing 1 and the screw 5. The connecting face 124 of the signal housing 1 can rotate around the curve face of D block, and because the screw 5 and the D block 2 press against the signal housing 1, it can only rotate upward and downward around the D blocks. When the sensor signal housing 1 rotates around the D block 2 counterclockwise, the spring will be deformed due to the pressure on the U pawl 6 from ratchet 23 because of the number of the ratchet teeth 23 on the D block, and the U pawl 6 will go into the ratchet sliding slot 125 so that the signal housing 1 can rotate to the needed angle around the D block. When the sensor signal housing 1 rotates around D block 2 clockwise, the U pawl 6 will protrude from the ratchet sliding slot 125 due to the resilience of the spring 7 and clips on the surface of the ratchet tooth 23, the rotation of the sensor signal housing 1 around D block 2 is restricted. The sensor signal housing 1 can rotate around D block clockwise again after push the U pawl 6 backward manually. With this mechanism, the sensor signal housing can only rotate around the D block counterclockwise and be locked at a desired angle.

The structure of this present invention is step-adjustable, because of the defined number of the ratchet teeth on D block 2. The step-adjustable tire pressure monitoring sensor signal housing assembly of this present invention is applicable for the rims of 5°-35°. Therefore, the assembly is widely applicable and is as easy as a traditional valve to install, only need to add an action to press the sensor signal housing. This assembly has no special demand for valve, which means both snap-in rubber valve and metal valve are available. Its product cost can be reduced tremendously because it can be applicable for many different rims.

The above-motioned embodiments are provided only for the description rather than the limitation of this present invention. Changes and medications can be made by technicians of the relevant field with the spirit and within the range of this present invention. Therefore all the equivalent technological solutions are subject to the limitation of the Claims.

The invention claimed is:

1. A step-adjustable tire pressure monitoring sensor signal housing assembly, including a valve and a valve core fixed on a rim, wherein the assembly further contain:
   a sensor signal housing which consists of a housing holder and a connecting part, the said connecting part has a curve connecting face where a Slot 1 is provided, and a Slot 3 is provided in the said connecting holder under the said connecting part;
   a D block, which is in D shape, includes a flat part and a cylinder part, a Slot 2 perpendicular to the said flat part is provided in the center of the said cylinder part with some ratchet teeth are provided longitudinally of the cylinder part by the side of the said mounting hole;
   a U-pawl and a spring installed in Slot 3 in the said connecting part, the said spring is in the bottom of the said U-pawl and the top of the said U-pawl is corresponding to the said ratchet teeth of the said D block; and
   a connector, which fixes the sensor signal housing and the D block onto the tire valve through the Slot 1 in the signal housing and the Slot 2 in D block.

2. A step-adjustable tire pressure monitoring sensor signal housing assembly according to claim 1, wherein the connecting face of the said sensor signal housing and the cylinder of the D block are concentric arcs.

3. A step-adjustable tire pressure monitoring sensor signal housing assembly according to claim 2, wherein the said Slot 1 is a curve long slot, the said Slot 3 and the ratchet teeth are in a same direction.

4. An adjustable tire pressure monitoring sensor signal housing assembly according to claim 2, wherein the said assembly further includes two rubber columns and on both sides of the signal housing each has connecting hole, the said rubber columns fix the signal housing onto the rim through the connecting holes.

5. An adjustable tire pressure monitoring sensor signal housing assembly according to claim 4, wherein the number of the ratchet teeth is 17.

* * * * *